(12) United States Patent
Jerabek

(10) Patent No.: US 10,349,757 B2
(45) Date of Patent: Jul. 16, 2019

(54) ADAPTER, GOODS CARRIER AND FASTENING SYSTEM

(71) Applicant: Visplay International AG, Muttenz (CH)

(72) Inventor: Harald Jerabek, Neuenburg (DE)

(73) Assignee: VISPLAY INTERNATIONAL AG, Muttenz (CH)

( * ) Notice: Subject to any disclaimer, the term of this patent is extended or adjusted under 35 U.S.C. 154(b) by 142 days.

(21) Appl. No.: 15/590,613

(22) Filed: May 9, 2017

(65) Prior Publication Data

US 2017/0318987 A1 Nov. 9, 2017

(30) Foreign Application Priority Data

May 9, 2016 (DE) .................. 10 2016 005 677

(51) Int. Cl.
*F16B 2/14* (2006.01)
*A47F 5/08* (2006.01)

(52) U.S. Cl.
CPC .......... *A47F 5/0853* (2013.01); *A47F 5/0838* (2013.01); *A47F 5/08* (2013.01); *A47F 5/0807* (2013.01); *A47F 5/0846* (2013.01)

(58) Field of Classification Search
CPC .... A47F 5/0853; A47F 5/0838; A47F 5/0846; F16M 2200/027; F16B 2/18
USPC .......... 248/220.21, 222.12, 225.21; 410/104
See application file for complete search history.

(56) References Cited

U.S. PATENT DOCUMENTS

| 4,103,852 A * | 8/1978 | Fisk ................. F16M 7/00 248/178.1 |
| 4,869,378 A | 9/1989 | Miller |
| 5,288,046 A | 2/1994 | Eklof et al. |
| 6,773,172 B1 * | 8/2004 | Johnson .............. F16M 11/041 248/187.1 |
| 9,919,657 B2 * | 3/2018 | Benedict .................. B60R 9/06 |
| 2011/0315840 A1 | 12/2011 | Connolly et al. |
| 2013/0125495 A1 * | 5/2013 | Thrush ................... F16M 13/02 52/588.1 |
| 2014/0252187 A1 * | 9/2014 | Petrovic ................. F16B 2/185 248/229.16 |
| 2017/0318987 A1 * | 11/2017 | Jerabek ................. A47F 5/0853 |
| 2018/0092472 A1 * | 4/2018 | Haroush .............. A47F 5/0861 |

FOREIGN PATENT DOCUMENTS

EP 2 752 134 7/2014

* cited by examiner

*Primary Examiner* — Bradley Duckworth
(74) *Attorney, Agent, or Firm* — Medler Ferro Woodhouse & Mills PLLC

(57) ABSTRACT

An adapter (1) for fastening a goods carrier to a longitudinal support profile (2) comprises a connecting element (13) to which the goods carrier can be connected, and a mounting structure (12) by means of which the adapter (1) can be detachably fastened to the support profile (2). The mounting structure (12) has adjusting mechanism (1222) with which the adapter (1) can be adjusted to a released position, a suspended position and a fixed position. In the released position the adapter (1) can be freely arranged on the support profile (2) and removed from it. In the suspended position the adapter (1) can be fastened to the support profile (2) and at the same time can be moved along the support profile (2). In the fixed position in the adapter (1) is rigidly connected to the support profile (2).

20 Claims, 7 Drawing Sheets

ADAPTER, GOODS CARRIER AND FASTENING SYSTEM

TECHNICAL FIELD

The invention relates to an adapter according to the generic term of independent Claim 1, as well as a goods carrier with such an adapter and a fastening system with such an adapter and a support rail. Such adapters with a connecting element, to which the goods carrier can be connected, and a mounting structure by means of which the adapter can be detachably fastened, may be used for fastening a goods carrier to a longitudinal support profile.

BACKGROUND

For presenting goods, for example in sales outlets or at exhibitions, in addition to goods carriers mounted on walls and erected on the floor also goods carriers which are secured to the ceiling are used. In this case the goods carriers are mounted in some cases directly on the ceiling or on fastening means connected to the ceiling, for example on hooks screwed into the ceiling.

Typically there is regularly a requirement for changing the goods display or its presentation, i.e. the requirement for exhibiting new goods and/or rearranging the goods. In this case the goods carriers mentioned must normally be removed from the ceiling at relatively high effort and replaced or reassembled somewhere else.

In order to have more flexibility for regular rearrangement of the goods display and associated presentation elements, support systems are known where goods carriers are fastened indirectly to the ceiling. For example, many such supporting systems comprise support profiles such as square tubes, which are mounted either directly on the ceiling or suspended from it. Goods carriers which are loaded with goods which are to be displayed are then suspended on the support profiles. In this case the goods carriers can be displaced, replaced or removed without necessitating major conversions or without having to re-mount the support profiles themselves.

Suitably, the support profiles of such support systems have a robust structure and are designed to carry relatively large loads. For example, the support profiles can be designed so that they can support several goods carriers, each of which are carrying a load of approximately one hundred kilograms.

In some applications support systems with support profiles can also be embedded in panels or similar structures. For example, the support profiles can in this case be secured to a supporting ceiling. Panels or stretched textile materials can then be mounted on the supporting ceiling in a lateral connection to the support profiles like this, the support profiles may be perceived optically as a component of the ceiling itself.

For fastening the goods carriers to the support profiles it is known to screw the goods carriers to the support profiles or to clamp them to the support profiles by means of clamping screws. Such a fastening is relatively cumbersome and tools have to be used which may necessitate the assistance of a specialist. This renders the fastening and the design of the goods carriers and their arrangement inflexible and uncomfortable. An alternative known method is to suspend the goods carriers from the support profiles. Although such suspension provides for relatively simple displacement and rearrangement of the goods carrier, the goods carriers thus suspended are comparatively unstable and there may be a risk of the entire goods carrier or its load falling down.

The objective of the present invention is therefore to propose a system and components which allow simple, flexible and secure fastening of a goods carrier on a support profile.

SUMMARY OF THE INVENTION

The objective is achieved according to the invention by an adapter such as that defined by the features of independent claim 1, and by a goods carrier such as that defined by the features of independent claim 14, as well as by a fastening system such as that defined by the features of independent claim 15. Advantageous embodiments of the invention are evident from the dependent claims.

In particular, the invention deals with an adapter for fastening a goods carrier to a longitudinal support profile. The adapter comprises a connecting element to which the goods carrier can be connected and a mounting structure by means of which the adapter may be detachably fastened to the support profile. The mounting structure is provided with an adjusting mechanism or mechanics by which the adapter can be adjusted to a released position, a suspended position and a fixed position. In the released position the adapter can be freely arranged on the support profile and removed from it. In the suspended position the adapter can be fastened to the support profile and can at the same time be moved along the support profile. In the fixed position the adapter is rigidly connected to the support profile.

The term "adjusting mechanism" or "adjusting mechanics" is understood to refer, in the context of the invention, to a structure which enables the adapter to be adjusted or switched to the three positions. In particular, this may be achieved with the adjusting mechanism without the use of tools. The adjusting mechanism may have components and forms which perform or initiate the adjustment of the mounting structure. They may also interact with other components of the adjusting mechanism so that the adapter can be adjusted to the three positions.

The term "goods carrier" may refer to a device which is provided for the presentation, display or arrangement of goods. Thereby, said goods carrier may have means for their arrangement adapted to the product. For example, it may comprise a support on which a product can be placed. Or it can be equipped with hooks or the like for suspending clothes hangers. For use with a ceiling support rail the goods carrier may comprise a rod which is connected to the connecting element of the adapter. This enables the goods carrier mounted on the ceiling support rail to extend downwards from the ceiling to a height at which the goods are clearly visible and accessible to people.

The term "detachable" in the context of the mounting structure of the adapter may refer, in particular, to the fact that the adapter can be repeatedly fastened to the support profile, according to the requirements, and removed from it again. What is not intended here, in particular, is for the adapter or the support profile to have to be damaged or disassembled in any way to remove the adapter.

The support profile may, in particular, be a ceiling support profile or a ceiling support rail. The term "longitudinal" may refer, in the context of the support profile, to a linear, quasi-linear or even curved shape. Here the longitudinal extension is in any case greater than the width extension. Thereby, the support profile or the above-mentioned parts thereof may be designed essentially straight in a cross-section along a longitudinal path.

The term "along", as used in this context, may refer to an extension or movement along the full or essentially full length. In this case a part may run along another part by extending parallel to it, by being arranged sequentially adjacent to it or by running alongside it. However, one of the parts typically does not run on or in the other part, at least over wide sections, but is separate from it. Similarly, one part can be moved along another part in that it can be moved parallel with or can be displaced or moved in engagement with it. In particular, the adapter can be suspended in the suspended position from the support profile and can here be fastened to it, and at the same time it can be displaced on the support profile. In the case of a ceiling support profile this may mean that the adapter is fixed vertically (in the z direction) in the suspended position and can be moved horizontally (in the x and/or y direction) when it is mounted on the support profile.

The term "can be freely arranged and removed" may, in relation to the adapter in the released position and the support profile, refer to the fact that the adapter is adjusted so that it is not engaged with the support profile. It can therefore be freely positioned on the support profile, moved along it and removed from it. In the released position, the adapter itself does typically not adhere to the support profile. In the case of a ceiling support profile this may mean that in the released position the adapter is movable vertically and horizontally (x direction, y direction and z direction), regardless of whether it is arranged on the support profile or is located elsewhere.

The term "fixed, in the context of the connection of the adapter to the support profile in the fixed position, may refer in particular to a connection that is fixed in place (in the x direction, y direction and z direction). In particular, the adapter and the support profile are therefore connected to each other quasi non-displaceably or immovably in this position.

Because the adapter is designed to be adjusted to the three different positions by means of its adjusting mechanism, it can be mounted on the support profile extremely easily and comfortably. In this case, for example, it can be arranged or suspended on the support profile in a first step in the suspended position. For example, it can be pushed bottom up vertically or in the z direction for this purpose onto or into the support profile which is fastened to a ceiling. In a second step, it can then be displaced along the support profile horizontally or in an x or y direction, and aligned to it. In a third step, the adapter can then be adjusted to the fixed position. In this position the adapter and its goods carrier can be securely fastened to the support profile and cannot be moved either horizontally or vertically. The goods carrier can now be safely loaded with goods. To rearrange the goods carrier the adapter can be adjusted back into the suspended position so that it can be displaced along the support profile and, hence, along the ceiling. In order to remove the goods carrier the adapter is adjusted to the released position and can therefore be easily removed from the support profile. The adapter according to the invention therefore allows reversible, simple, flexible and secure fastening of the goods carrier to the support profile, for which no tool is required.

The mounting structure of the adapter preferably has two opposing mounting sections which interact with two contact sections of the support profile extending along the support profile, to fasten the adapter to the support profile, wherein a distance between the mounting sections can be varied with the adjusting mechanism of the mounting structure so that the distance between the mounting sections is different in, respectively, the released position, in the suspended position and in the fixed position. The mounting sections may be designed in the form of wings or wall sections. They may oppose each other and/or run quasi parallel with each other. Such a design of the mounting structure allows simple, safe and tool-less adjustment of the adapter to the three positions.

Preferably, the mounting sections of the mounting structure each have one suspension lug with a contact surface, wherein the suspension lugs can be connected to the contact sections of the support profile so that the contact surfaces of the suspension lugs rest against corresponding contact surfaces of the contact sections. The suspension lugs of the two mounting sections may be orientated towards or away from each other. Such suspension lugs allow efficient fastening or suspension of the adapter to or on the support profile. In particular, the suspension lugs may snap into the support profile when the adapter is assembled on the support profile by means of the resilient mounting sections, which may be particularly comfortable. Moreover, the suspension lugs allow secure arrangement of the adapter in the suspended position in which the suspension lugs engage with the support profile.

Preferably, in the released position, the distance between the mounting sections is dimensioned so that the contact surfaces of the suspension lugs of the mounting sections can be moved freely past the contact surfaces of the contact sections of the support profile, in the suspended position, the distance between the mounting sections is dimensioned so that the contact surfaces of the suspension lugs of the mounting sections rest against the contact surfaces of the contact sections of the support profile when the adapter is arranged on the support profile, and, in the fixed position, the distance between the mounting sections is dimensioned so that the contact surfaces of the suspension lugs of the mounting sections rest against the contact surfaces of the contact sections of the support profile and the mounting sections are pressed onto the contact sections of the support profile when the adapter is arranged on the support profile.

The adapter preferably has a base on which the mounting sections of the mounting structure are fastened so that they can be resiliently moved towards each other and away from each other. The adapter may also comprise two similar mounting structures which emerge, for example, from two opposing sides of the basis. Because the mounting sections are designed so that they can be moved resiliently or elastically towards each other, they can be adjusted relatively easily and efficiently to the three positions of the adapter. They can then be snapped into the support profile when the adapter is in the suspended position, which allows simple and secure suspension on the adapter.

The adjusting mechanism of the mounting structure preferably comprises a longitudinally adjustable axial element which is arranged between the two mounting sections and which is connected to them. Because the axial element is longitudinally adjustable, the mounting sections can be moved efficiently away from each other and towards each other. Consequently the distance between the mounting sections can be easily adjusted.

Thereby, the axial element of the adjusting mechanism of the mounting structure preferably comprises a cylindrical sleeve and two journals, wherein the journals are each connected to one of the mounting sections, project into the cylindrical sleeve and can be moved axially to it. The cylindrical sleeve may be essentially in the shape of a hollow cylinder or may have a section which is essentially in the shape of a hollow cylinder. The journals may be suitably cylindrical in shape or may have a section which is essentially cylindrical in shape. The connection between the journals and the assembly section may be fixed or loose.

The cylindrical sleeve and the journals are preferably rotatable relative to each other about a longitudinal axis. Here, the journals preferably each have a pin projecting essentially radially and the cylindrical sleeve is preferably equipped with two cutouts each designed as guide contours, wherein the pins of the journals each extend through one of the guide contours of the cylindrical sleeve. The guide contours can in this case be designed so that a rotation of the cylindrical sleeve and the journals relative to each other gives rise to a longitudinal displacement of the journals towards the cylindrical sleeve. This enables the axial element to be efficiently longitudinally adjusted by means of a rotary movement.

The guide contours of the cylindrical sleeve are each preferably shaped so that the journals can be moved axially relative to each other independently of a rotation of the cylindrical sleeve and the journals. The term "axial" used in this context may, in particular, refer to a longitudinal axis of the axial element or the cylindrical sleeve and journals. All these longitudinal axes advantageously lie on a straight line. Such a design of the guide contours allows precise, simultaneous longitudinal displacement of the journals by means of a relatively simple rotary movement.

The adjusting mechanism of the mounting structure preferably has an actuating lever rigidly connected to the cylindrical sleeve, by means of which lever the cylindrical sleeve can be rotated relative to the journals about the longitudinal axis. Such an actuating lever allows simple, controlled rotation or displacement of the cylindrical sleeve and journals relative to each other. The actuating lever is advantageously rigidly connected to the journals or, in particular, to the cylindrical sleeve.

Thereby, the mounting structure preferably has a spring element and the cylindrical sleeve of the axial element is preferably connected to a toothing, wherein the spring element, in the suspended position of the adapter, engages the toothing so that the mounting structure is secured in the suspended position of the adapter. The spring element may also engage with the toothing in the fixed position of the adapter and secure this position. Such a spring element and such a toothing allow safe adjustment and retention of the adapter in the three positions.

The adjusting mechanism preferably comprise an out of round flank section arranged at least partially around the cylindrical sleeve of the axial element, which flank section is designed to ensure that a distance between the flank section and the contact surface of the suspension lug of one of the mounting sections in the fixed position of the adapter is shorter than in the suspended position of the adapter. In particular, the shorter distance may be dimensioned so that the contact surface of the associated contact section of the support profile is clamped between the flank section and the contact surface of the suspension lug. The adjusting mechanism may also comprise two similar flank sections formed laterally around the cylinder sleeve. This allows preferred uniform clamping and fixing.

Another aspect of the invention relates to a goods carrier with a support structure and an adapter as described above. Such a goods carrier allows for efficient implementation of the invention and the preferred embodiments thereof, with the effects and advantages stated above, among others.

A further other aspect of the invention relates to a fastening system with an adapter as described above and a longitudinal support profile or ceiling support profile. Such a fastening system allows for an efficient implementation of the invention and the preferred embodiments thereof with the effects and advantages stated above, among others. The ceiling support profile or support profile is preferably designed as described in further detail in the following:

The ceiling support profile is provided for fastening a goods carrier to a ceiling. It is of longitudinal design and comprises a fastening structure for mounting on the ceiling and a carrier suspension device aligned against or angled towards the fastening device. The carrier suspension device in which the goods carrier or the adapter may be suspended extends along the support profile. The support profile may also have a busbar element running along the carrier suspension device.

The ceiling support profile may have an upper side and a lower side, wherein the fastening structure is formed on the upper side and the carrier suspension device, as well as the busbar element are designed so that they are accessible on the lower side or from the lower side. The ceiling support profile may be manufactured as a single component, e.g., from a metal or a robust plastic. It may be shaped to appear on the outside as a square tube.

The support profile can be rigidly connected to the ceiling by means of the fastening structure. For example, a rod which is screwed to the ceiling may be connected to the fastening structure. The fastening structure may comprise openings or drilled holes made in the ceiling support profile, into which an element connected to the ceiling can be inserted or through which such an element can be screwed to the support profile.

The carrier suspension device is advantageously designed so that the goods carrier or adapter can be suspended to it at different positions along the ceiling support profile. In particular, it may interact with the goods carrier or adapter so that it can be suspended in the longitudinal direction at any point. This allows particularly flexible fastening and alignment of the goods carrier in the room. Moreover, several goods carriers can be suspended simultaneously from the carrier suspension device of the same ceiling support profile.

The term "aligned" in the context of the fastening structure and the carrier suspension device may refer to a functional orientation of these parts. Thereby, alignment of the fastening structure may refer to the direction in which the ceiling support profile can be fastened. In the case of a horizontal ceiling this direction is typically vertically upwards from the ceiling support profile. The alignment of the carrier suspension device may refer to the direction from which the goods carrier is suspended or in which it is suspended. In the case of a ceiling support profile fastened to a horizontal ceiling, this direction is therefore normally vertically downwards when the carrier suspension device is aligned towards the fastening structure. If it is aligned at an angle to it, this direction is inclined towards the ceiling support profile or laterally away from the ceiling support profile. For example, the carrier suspension device in this case may be aligned perpendicularly or quasi perpendicularly to the fastening structure. Typically the fastening device is formed on the upper side of the ceiling support profile if the ceiling support profile is fastened to the horizontal ceiling, and the carrier suspension device is formed on the lower side of the ceiling support profile.

The ceiling support profile may have a busbar element. In order to supply a consumer on or in the goods carrier or adapter the busbar arranged in the busbar element of the ceiling support profile or implemented thereby may be connected to the goods carrier or adapter. This connection may be essentially independent of any supporting function. For example, a consumer such as a screen or light may be provided on the goods carrier which is connected via a cable to an adapter which is in turn inserted in the busbar of the support profile. Moreover, the busbar may feed electronic consumers directly and even support them, these consumers being independent of the goods carriers or adapters. Typically such consumers are relatively light compared to loaded goods carriers, so that the busbar must have considerably lower load carrying capacity than the carrier suspension device.

The busbar element preferably runs in parallel to the carrier suspension device. Because of a parallel arrangement of the busbar element with the carrier suspension device, the support profile can be designed and manufactured so that it is efficient and space saving.

The term "suspendable", in the context of the goods carrier and adapter and the carrier suspension device, may refer to any design which is suitable for suspending the goods carrier or adapter on the ceiling support profile. Such suspension may, in particularly, differ from a suspension of the goods carrier or adapter around the support element. The section of the goods carrier or adapter suspended on the ceiling support profile may be covered when suspended and may therefore be protected from the outside and may be invisible. The suspension may therefore refer to the fact that the goods carrier or adapter only contacts the ceiling support profile from the side from which the carrier suspension device is accessible. For example, the carrier suspension device may comprise a series of hooks or slots in which a corresponding section of the goods carrier or adapter may engage. Alternatively the carrier suspension device may have a clamping structure in or on which a suitable section of the goods carrier or adapter can be clamped.

The carrier suspension device preferably has a suspension groove extending along the ceiling support profile. The term "groove" may refer in this connection to a channel-shaped, elongated or longitudinal and typically angled recess in the ceiling support profile. Thereby, the groove may have two opposing lateral walls, a rear wall connecting the two lateral walls and an opening opposing the rear wall. In the case of a carrier suspension device accessible vertically from below, the open side or the opening may lie at the bottom, the lateral walls may extend upwards from the opening or the open side, and the rear wall may lie at the top. The open side may be open to the extent that it is physically not present, or consists exclusively of the opening. The groove may be angled in design in one cross-section, and in particular the lateral walls and the open or closed side may each describe an angle, e.g. a quasi-right angle.

In this case, the suspension groove preferably has a slotted opening or slot and a reference width connecting to the opening, wherein the opening extends over less than the whole reference width of the suspension groove. The term "width", in the context of the suspension groove and other grooves mentioned in connection with the ceiling support profile, may refer to a width of the interior of the groove. In the case of grooves with parallel or quasi parallel lateral walls, the width may correspond to a distance between the lateral walls. The reference width corresponds here to the width of the suspension groove connecting directly to the opening. In the case of a uniform suspension groove with parallel lateral walls, the reference width corresponds to the distance between the lateral walls, which is constant. Similarly the reference width corresponds, in the case of a suspension groove extending continuously from the opening, to the minimum width of the suspension groove or the minimum distance between the lateral walls.

Because the slotted opening does not extend over the entire reference width of the suspension groove, a wall section of the suspension groove runs as a contact section adjacent to and along the opening, preferably at least on one side, but preferably on both sides. The wall section may be engaged from behind by a section of the goods carrier inserted into the suspension groove through the opening so that the goods carrier or adapter can be retained in the suspension groove. In particular, the slotted opening may be accessible quasi vertically from below. Here the wall section lies correspondingly quasi horizontally.

A suspension lug of the goods carrier or adapter inserted in the suspension groove may engage behind the contact sections or their lugs and prevent the goods carrier from being pulled vertically out of the suspension groove again through the slotted opening. This enables the goods carrier to be suspended and fastened simply and efficiently at any point along the support profile.

The carrier suspension device preferably has two parallel suspension grooves extending along the ceiling support profile. Such a design of the ceiling support profile, with two suspension grooves, allows relatively stable fastening of the goods carrier or adapter. In particular, the goods carrier or adapter can be designed with a section which can engage simultaneously in both suspension grooves. This may provide improved distribution of the support load over the width of the ceiling support profile, which may increase stability. Moreover, the goods carrier or adapter can be stabilised in terms of a lateral movement.

Thereby, the busbar element is preferably formed between the two suspension grooves. Such a design of the ceiling support profile allows a space-saving, efficient arrangement of the suspension grooves and busbar element. In particular, this enables the suspension grooves to be separated by a relatively long distance and to lie close to longitudinal edges of the ceiling support profile, which may be advantageous for the distribution of the support load on the support profile and for the stability of the suspension of the goods carrier or adapter.

In a first preferred embodiment of the ceiling support profile the busbar element is a busbar. Such a design enables the ceiling support and profile to be formed in one piece. A single-piece structure allows simple and efficient handling.

In a second preferred embodiment of the ceiling support profile the busbar element is a busbar socket. The busbar socket can be shaped so that it is suitable for the optimal assembly of a multiplicity of different busbars. This enables the ceiling support profile to be fitted with a preferred busbar at the discretion of a user. The user is therefore not obliged to use a particular busbar but he may select a busbar adapted to the particular application or one designed for a preferred light, and equip the ceiling support profile accordingly.

The fastening structure of the ceiling support profile preferably comprises a ceiling fastening groove. Like the suspension groove and the busbar fastening groove, the ceiling fastening groove may also have a slotted opening and a reference width connecting to the opening, wherein the opening does not extend over the entire reference width of the ceiling fastening groove.

The ceiling fastening groove enables the ceiling support profile to be connected to the ceiling at one or in particular several arbitrary points along the ceiling support profile. This enables the ceiling support profile to be assembled on the ceiling, taking into account the condition of the ceiling. In particular, because of the flexible ceiling mounting along the ceiling support profile, consideration may be given to points on the ceiling which are particularly suitable for fastening of the ceiling support profile. For example, a nut may be inserted into the ceiling fastening groove for fastening on the ceiling. For example a support bar can be screwed into the nut through the opening of the ceiling fastening groove, which support bar in turn can be mounted on the ceiling.

A laterally aligned auxiliary construction groove preferably extends along the ceiling support profile. Similarly to the suspension groove, the busbar fastening groove and the fastening groove, the auxiliary construction groove may also have a slotted opening and a reference width connecting to the opening, wherein the opening does not extend over the entire reference width of the auxiliary construction groove.

Such a lateral auxiliary construction groove may be suitable for the flexible fitting of the support profile with different auxiliary structures. For example, a nut can be inserted in the lateral auxiliary construction groove, which nut is screwed to a clamping frame. The clamping frame, which may be provided for textiles, for example, then extends laterally away from the ceiling support profile, or a nut can be inserted in the auxiliary construction groove screwed to a ring. Different devices may then be suspended from the ring, for example by means of snap hooks, or canvas may be clamped directly in the rings by means of rubbers or cords. Or curtain rails of hanging lengths of material may be inserted in the rings. Other auxiliary structures may be lateral support profiles which are suspended directly in the auxiliary construction groove. For example, such support profiles may have an angular design or may be quasi L-shaped. Ceiling materials such as wood materials, plaster fibres or plasterboard, glass, plastics, sheets or perforated sheets of expanded metals, acoustically active materials, planar lights or similar may be placed on the support profiles suspended in the auxiliary construction groove With auxiliary structures of the type described above the ceiling may designed to be optically flush with the ceiling support profile. A suspended ceiling, which is provided with busbars and support rails accessible vertically from below, may therefore be efficiently formed by means of such ceiling support profiles.

Thereby, preferably two laterally aligned and opposing auxiliary construction grooves may extend along the ceiling support profile. Providing the ceiling support profile with auxiliary construction grooves on both sides allows the ceiling support profile to be fitted on both sides with auxiliary structures of the type described above or an alternative type.

BRIEF DESCRIPTION OF THE DRAWINGS

Further advantageous embodiments of the invention are evident from the following description of embodiments of the invention by means of the schematic drawings. In particular, the invention is described in greater detail in the following with reference to the attached drawings, in which.

DESCRIPTION OF EMBODIMENTS

Figure 1:
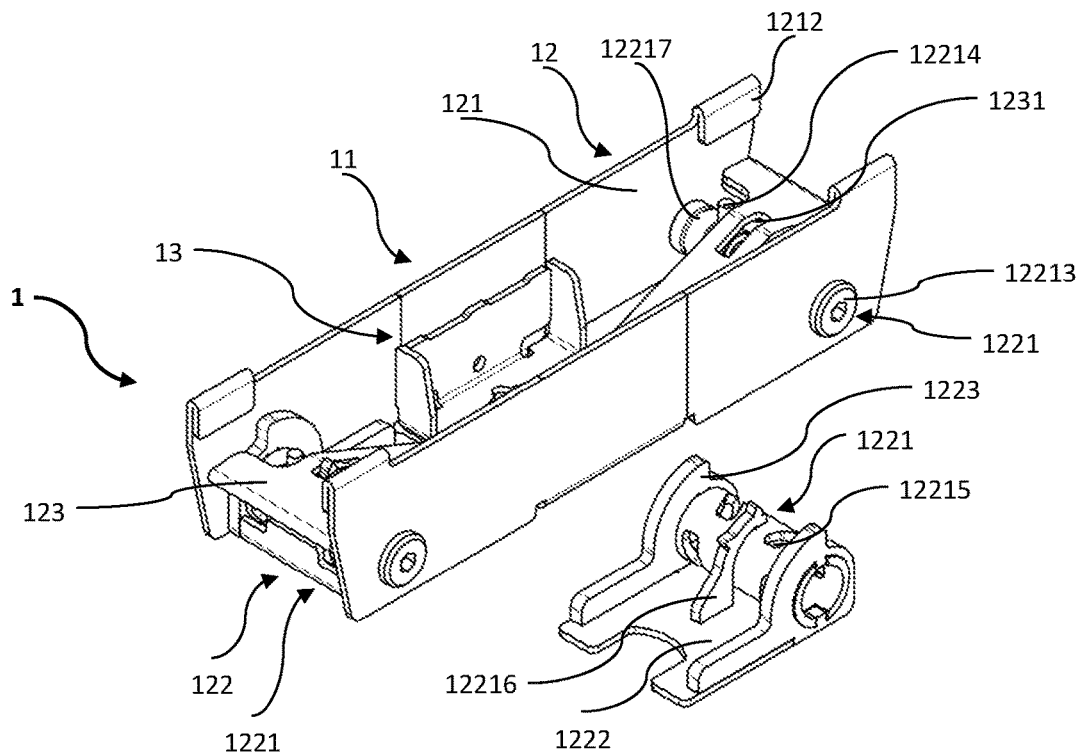
FIG. 1 shows a partially exploded perspective view of an embodiment of an adapter according to the invention of an embodiment of a fastening system according to the invention.

Certain expressions are used in the following description for practical reasons and are not to be understood as restrictive. The words "right", "left", "down" and "up" denote directions in the drawing to which reference is made. The expressions "inward", "outward", "below", "above", "left", "right" or similar are used to describe the arrangement of designated parts relative to each other, the movement of designated parts relative to each other and the directions towards or away from the geometrical center of the invention as well of designated parts of the same, as shown in the figures. These spatial relative data also include positions and alignments other than those shown in the figures. For example, if a part shown in the figures is reversed, elements or features which are described as "below" are then "above". The terminology includes the words, derivations thereof and words of similar meaning expressly mentioned above.

In order to avoid repetitions in the figures and the associated description of the different aspects and embodiments, certain features are understood to be common to different aspects and embodiments. The omission of an aspect in the description or in a figure does not mean that this aspect is missing in the associated embodiment. On the contrary, such an omission may serve to improve clarity and present repetitions. In this connection the following statement applies to the entire remainder of the description: If a figure contains reference symbols for the purpose of clarity of the drawing, but is not mentioned in the directly associated description text, reference is made to its explanation in previous figure descriptions. Moreover, if reference symbols which are not contained in the associated figure are mentioned in the description directly associated with a figure, reference is made to the preceding and following figures. Similar reference symbols in two or more figures stand for similar or the same elements.

FIG. 1 shows an embodiment of an adapter 1 according to the invention, wherein a part of its adjusting mechanism 122 is removed for the purposes of illustration. The adapter 1 comprises a central base 11, a connecting element 13 and a mounting structure 12 with an adjusting mechanism 122, two pairs of mounting sections 121 and two spring levers 123. Each pair of the mounting sections 121 extends from the base 11 into a longitudinal direction of the adapter 1. The mounting sections 121 are designed in the shape of a wall or wing. The two mounting sections 121 of a pair oppose each other and run quasi parallel to each other. They are rigidly connected to the base 11 and may be moved resiliently towards or away from each other. The mounting sections 121 each have a suspension lug 1212 formed by turning or folding. Both suspension lugs 1212 of a pair of mounting sections 121 oppose each other and are aligned inwardly towards each other.

The adjusting mechanism 122 of the mounting structure 12 comprises two longitudinally adjustable axial elements 1221, each of which is arranged between the two mounting sections 121 of a pair. The axial elements 1221 each has a hollow cylindrical section 12212 and two journals 12211. The hollow cylindrical sections 12212 each has a hollow cylindrical section with a longitudinal axis and an interior space. The hollow cylindrical section of cylindrical sleeves 12212 is provided, in each case, with two analogous guide contours 122125, which are formed by cutouts in the cylinder wall. Each of the four journals 12211 has a cylindrical pin 12217 projecting on one side into the associated cylindrical sleeve 12212, which pin 12217 is dimensioned to correspond to the interior space of cylindrical sleeve 12212. Laterally, each of the four journals 12211 is connected rigidly to one of the four mounting sections 121 by means of a fastening screw 12213.

The journals 1221 each comprise a pin 12214 projecting radially from the pin cylinder 12217, which pin 12214 extends through one of the guide contours 11215 of the associated cylindrical sleeve 12212. Cylindrical sleeves 12212 can be turned or rotated towards the two associated journals 12211 about their longitudinal axes. For manual rotation of cylindrical sleeves 12212, these are rigidly connected to an actuating lever 1222. A rotation of cylindrical sleeves 12212 about their longitudinal axes causes the pins 12214 of the journals 12211 to be displaced along the guide contours 12215. The journals 12211 are thereby moved along the longitudinal axis or axially due to the shape of the guide contours 12215. Consequently, the mounting sections 121 are moved towards or away from each other and the distance between the mounting sections 121 is adjusted.

On the outer surface of their cylinder walls, the cylindrical sleeves 12212 are each provided with a toothing 12216 aligned in the peripheral direction. The spring levers 123 are each designed in the manner of a leaf spring and are roughly T-shaped, and extent from the base 11 in the longitudinal direction via the axle elements 1221. In the region of the toothings 12216 of the cylindrical sleeves 12212, the spring levers 123 are each designed with a tooth opening 1231 in which the teeth of the toothing 12216 of the associated cylindrical sleeve 12212 engage in certain rotary positions.

The adjusting mechanism 122 further comprises four flank sections 1223. They are out of round and arranged in the manner of a flange round the cylindrical sleeve 12212, wherein each cylindrical sleeve 12212 is provided at both its longitudinal ends each with one of the flank sections 1223. The flank sections 1223 are each arranged adjacently to one of mounting sections 121.

Figure 2:
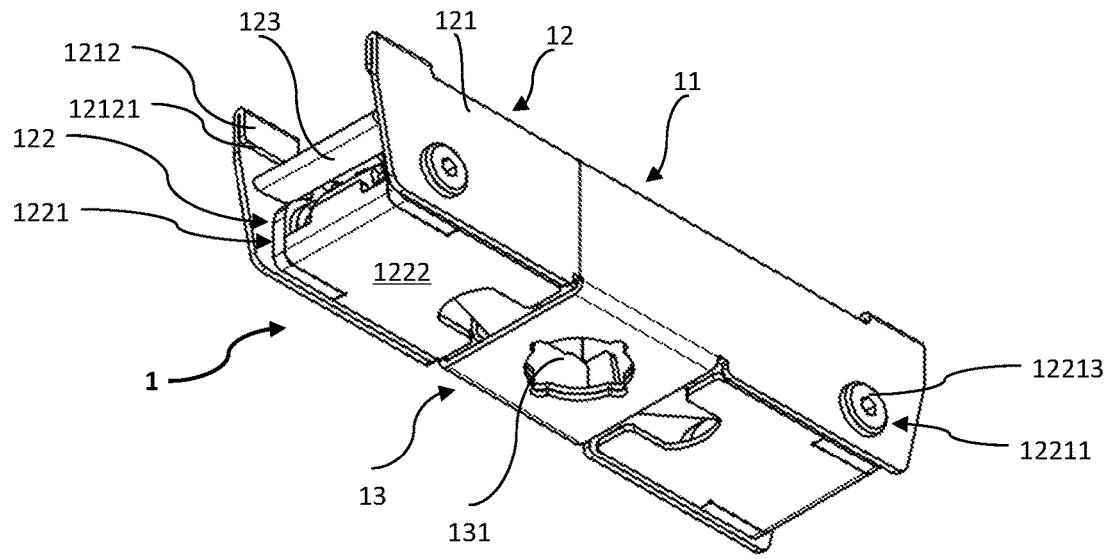
FIG. 2 shows a perspective view from below of the adapter of FIG. 1.

FIG. 2 shows the adapter from below, wherein the adjusting mechanism 122 of the mounting structure 12 is fully installed. The connecting element 13 has a horizontal plate in which an opening is inserted as goods carrier connection 131. In the goods carrier connection 131 an arm or a rod of a goods carrier can be inserted and rigidly connected to the adapter 1. Here, a rotary position of the arm can be freely adjusted, enabling the goods carrier to be suitably aligned to the application provided.

The suspension lugs 1212 each have a contact surface 12121 aligned horizontally downwards. The contact surfaces 12121 are in this case formed by the end of the fold.

Figure 3:
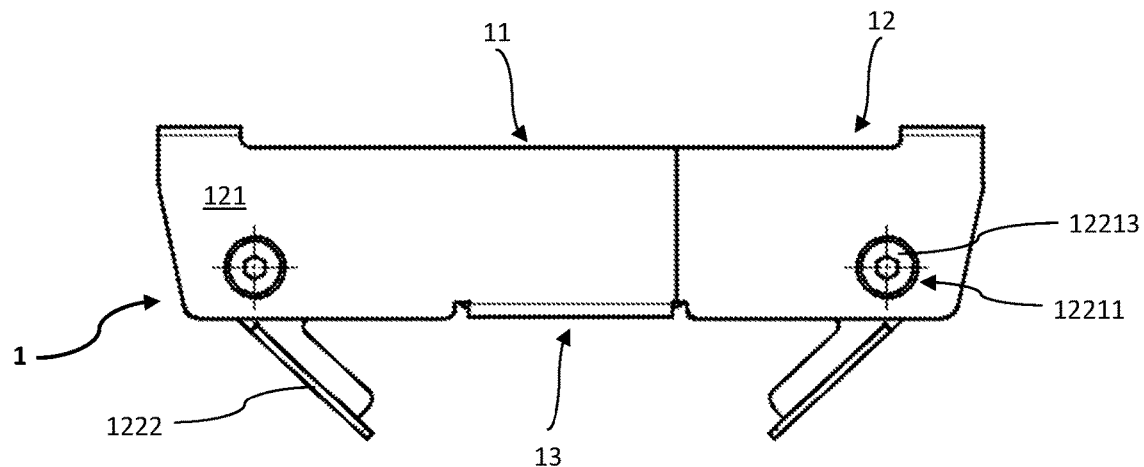
FIG. 3 shows a side view of the adapter of FIG. 1 in a suspended position.
Figure 4:
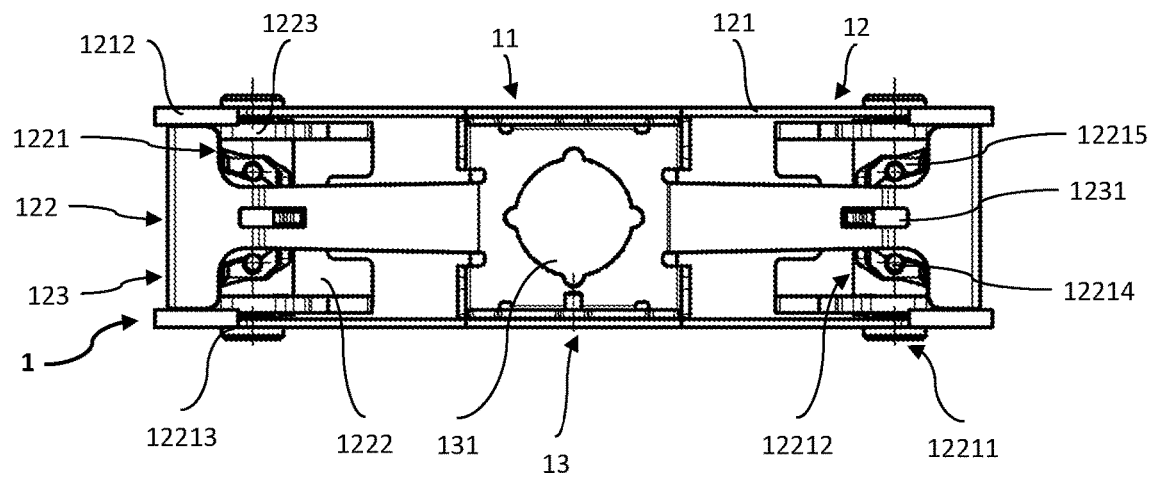
FIG. 4 shows a top view of the adapter of FIG. 3.

FIGS. 3 and 4 show the adapter 1 in a suspended position. To achieve this, the two actuating levers 1222 are rotated downwards approximately into a diagonal position. The pins 12214 of the journals 12211 lie approximately in the center of the guide contours 12215. At this location, the guide contours 12215 have a saddle on which they run in the peripheral direction, and not obliquely. The toothings 12216 each engage with their central tooth in the tooth opening 1231 of the associated spring lever 123. Consequently, the adapter 1 is secured in the suspended position.

Figure 5:
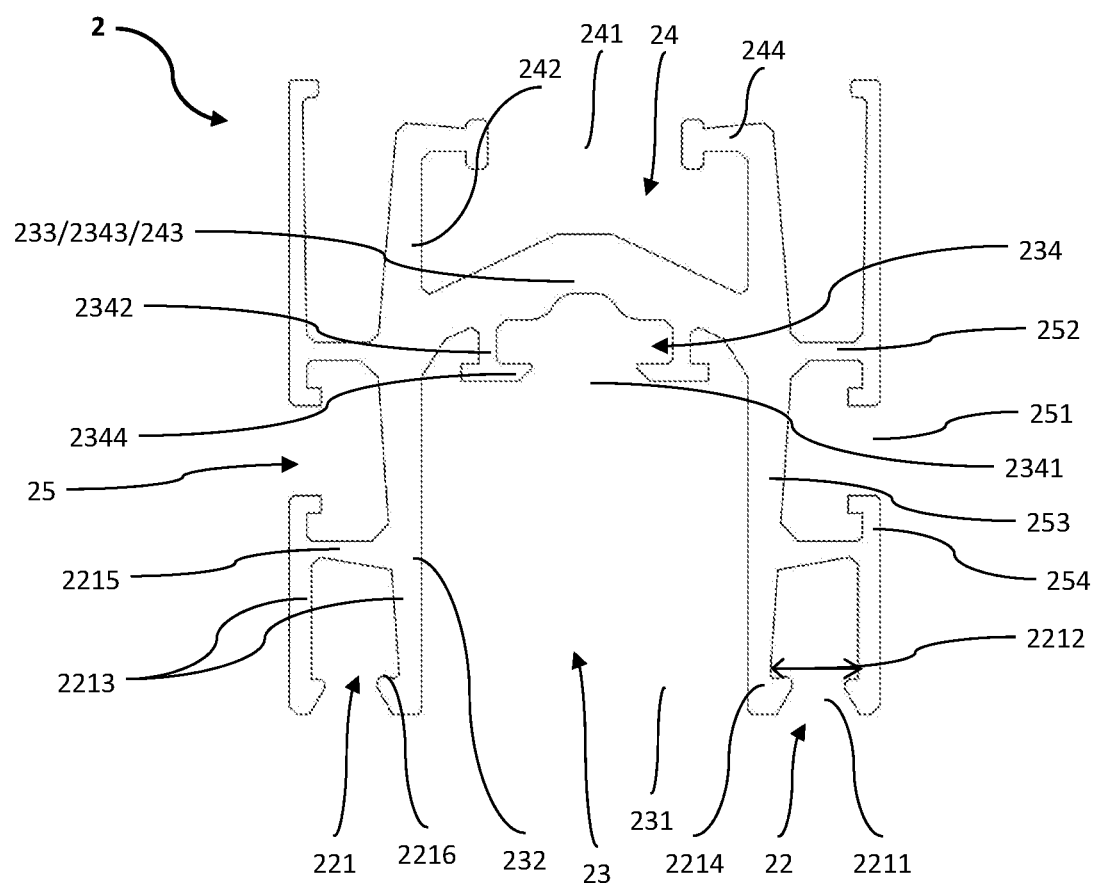
FIG. 5 shows a front view of an embodiment of a support profile according to the invention of the support profile of the fastening system of FIG. 1.

FIG. 5 shows an embodiment of a longitudinal ceiling support profile 2 as an embodiment of a support profile of a connecting system according to the invention. The ceiling support profile 2 is formed in one piece and, when viewed from the outside, has roughly the shape of a square tube. In the representation of FIG. 2, the supporting profile 1 is aligned in such a manner as typically specified for assembly on a ceiling. Here, it has an upper side associated with the ceiling, a lower side associated with the floor and two flank sides connecting the upper side quasi at right angles to the lower side.

The supporting profile 2 comprises a groove-shaped busbar seating 23 accessible centrally from its lower side, with two parallel, vertical lateral walls 232, an upper rear wall 233 connecting both lateral walls 232, and an opening 231 opposing the rear wall 233. The opening 231 extends over the entire width of the busbar seating 23 and along the entire ceiling support profile 2. Correspondingly, the opening 231 is slotted and is accessible and visible from the lower side of the ceiling support profile 2.

The ceiling support profile 2 furthermore comprises a carrier suspension device 22, which incorporates two suspension grooves 221 running laterally to and parallel with the busbar seating 23, along the entire ceiling support profile 2. The suspension grooves 221 each have two quasi vertical lateral walls 2213, an upper rear wall 2215 connecting lateral walls 2213, a lower opening 2211 opposing the rear wall and two wall sections positioned laterally to opening 2211. The lateral walls 2213 associated with one of the two suspension grooves 221 widen slightly downwards so that they are slightly further away from each at their lower ends than at their upper ends. The lateral walls 2213 are therefore furthest away from each other adjacent to the opening 2211, wherein this maximum distance defines a reference width 2212 of the associated suspension groove 221.

The openings 2211 of the two suspension grooves 221 extend over the entire length of the ceiling profile 2 and are therefore slotted. The wall sections of the suspension grooves 221 are each formed by the associated opening 2211 extending over less than the entire reference width 2212. The reference widths 2212 of the suspension grooves 221 are therefore larger than the width of their slotted openings 2211. The suspension grooves 221 are aligned vertically downwards. The inner wall sections of the suspension grooves 21 are designed as contact sections of the ceiling support profile 2 and each have a downwardly directed lug 2216. The lugs 2216 each form an upwardly aligned horizontal contact surface 2216.

A busbar fastening groove 234 with two parallel, vertical lateral walls 2342, an upper rear wall 2343 connecting the two lateral walls 2342, and a lower slotted opening 2341 opposing rear wall 2343, is formed on the rear wall 233 of the busbar seating 23. The opening 2341 of the busbar fastening groove 234 has a width which is smaller than a distance between the two lateral walls 2342. Correspondingly, the busbar fastening groove 234 has wall sections 2344 laterally adjacent to the opening 2341 and connected to the lateral walls 2342 at a right angle. The busbar fastening groove 23 extends over the entire length of the busbar seating 23 and hence over the entire length of the ceiling support profile 2. It is aligned vertically downwards.

The busbar seating 23 is opposed by, on the upper side of ceiling support profile 2, a ceiling fastening groove 24 as fastening structure. The ceiling fastening groove 24 comprises two parallel lateral walls 242, a lower rear wall 243 connecting the lateral walls 242 and an upper opening 241 opposing rear wall 243. The opening 241 extends over the entire length of the ceiling support profile 2 and is therefore slotted. It has a width which is smaller than a distance between the lateral walls 242. Two wall sections 244, which connect at right angles to the lateral walls 242, are arranged between the opening 241 and the lateral walls 242. At their inner ends facing each other, the wall sections 244 are provided with a flanged section so that they extend upwards and downwards adjacent to the opening 241. The ceiling fastening groove 24 is aligned vertically upwards.

Two auxiliary construction grooves 25, which oppose each other and are aligned horizontally, laterally, to the left and to the right, are formed on both flank sides of the ceiling support profile 2. They each comprise two parallel lateral walls 252, an inner rear wall 253 connecting lateral walls 252 and an outer opening 251 opposing the rear wall 253. The openings 251 extend over the entire length of the ceiling support profile 2 and are therefore slotted. They have a width which is smaller than a distance between the lateral walls 252. Two wall sections 254, which connect at right angles to the lateral walls 252, are each arranged between the opening 251 and the lateral walls 252. At their ends facing each other, the wall sections 254 are each bent inwards.

Figure 6:
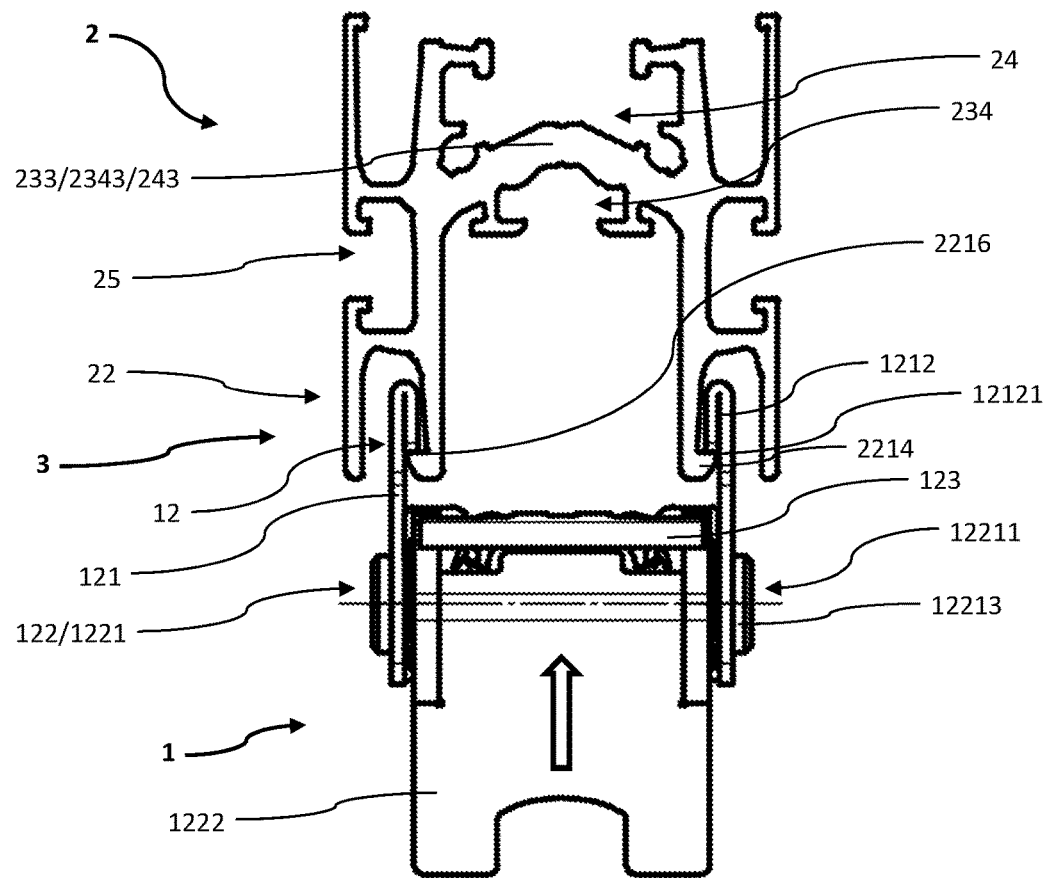
FIG. 6 shows a front view of the adapter and the support profile of the fastening system of FIG. 1 in the suspended position of the adapter.

FIG. 6 shows an embodiment of a fastening system 3 according to the invention, in which the adapter 1 is suspended from the ceiling support profile 1. To achieve this, the adapter 1, denoted by the arrow in FIG. 6, is inserted vertically from bottom to top into ceiling support profile 2. In the process, the mounting sections 121 of adapter 1 are inserted in the suspension grooves 22 of the ceiling support profile 2. During insertion, the mounting sections 121 are briefly bent inwards until the suspension lugs 1212 are positioned past lugs 2216 of the contact sections of the suspension grooves 22 and snap in behind them. The contact surfaces 12121 of the suspension lugs 1212 of the adapter 1 are located on the contact surfaces 2216 of the contact sections of the ceiling support profile 2. The adapter 1 is therefore suspended from the ceiling support profile 2 and cannot be moved vertically downwards or in the z direction in this position. However, the adapter 1 can therefore be displaced and positioned horizontally along ceiling support profile 2.

Figure 7:
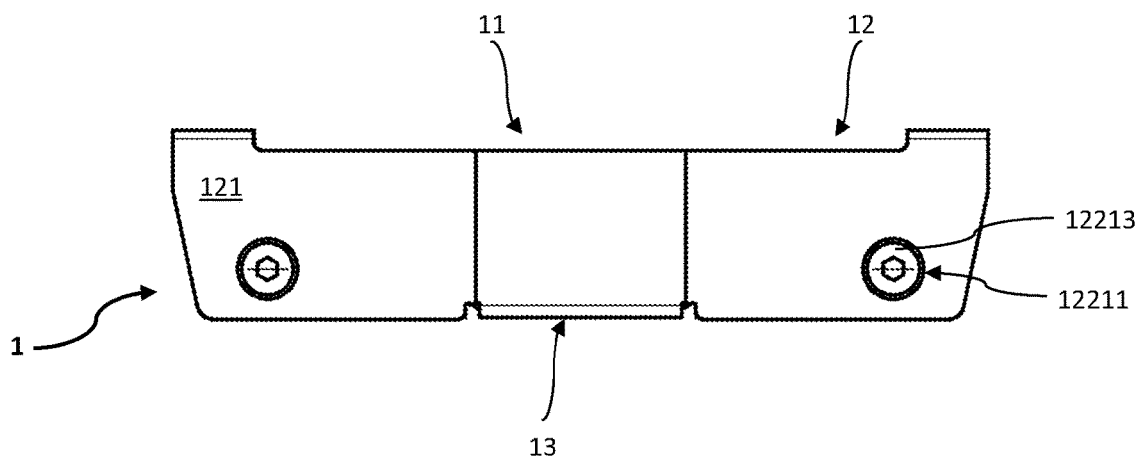
FIG. 7 shows a side view of the adapter of FIG. 1 in its fixed position.
Figure 8:
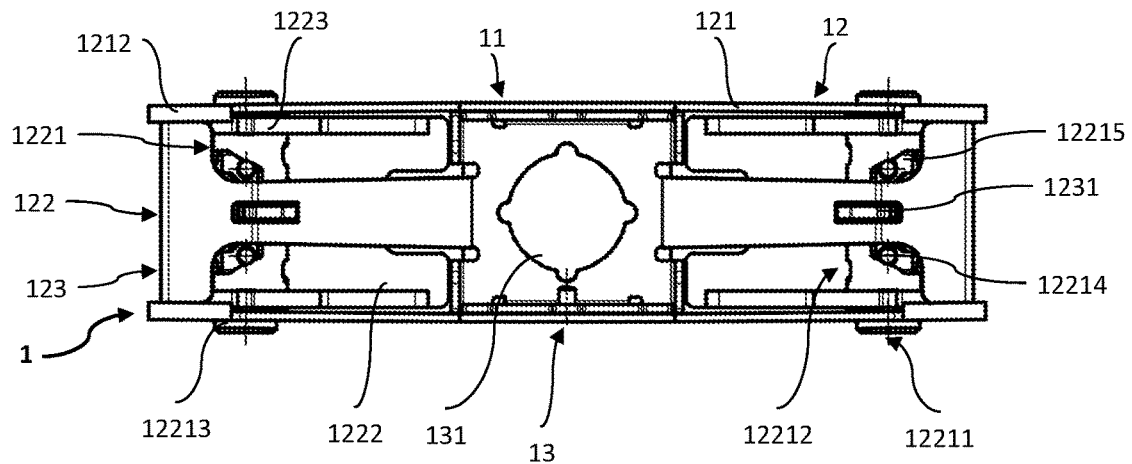
FIG. 8 shows a top view of the adapter of FIG. 7.

FIGS. 7 and 8 show the adapter 1 in a fixed position. Here, the two actuating levers 1222 are rotated upwards into a horizontal position. The pins 12214 of the journals 12211 lie at the inner longitudinal end of the guide contours 12215. The guide contours 12215 run obliquely inwards from their center or saddle. When actuating the levers 1222 to the fixed position, the pins 12214 are pushed inwardly towards each other by the outer edge of the guide contours 12215. Consequently, the journals 12211, and with them the mounting sections 121, are moved towards each other. In the process, the mounting sections 121 of a pair are resiliently bent towards each other. In the fixed position, the distance between the mounting sections 121 of a pair is therefore smaller than in the released position. The toothings 12216 each engage with one of their teeth in the tooth opening 1231 of the associated spring lever 123. This secures the adapter 1 in the fixed position.

Figure 9:
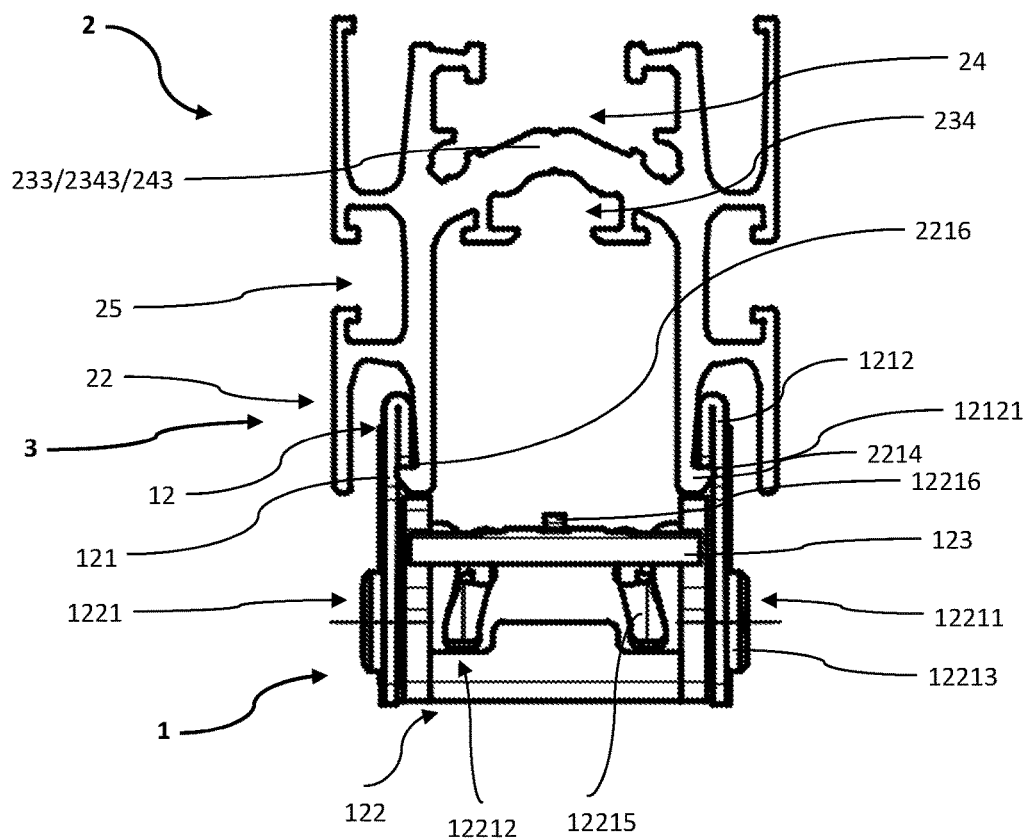
FIG. 9 shows a front view of the adapter and the support profile of the fastening system of FIG. 1 in the fixed position of the adapter.

FIG. 9 shows the fastening system 3 with the adapter 1 arranged in the fixed position. Here, the adapter 1 is suspended from the ceiling support profile 2 similarly to the suspended position described above. Unlike the suspended position, the mounting sections are pressed against the contact sections of the ceiling support profile 2 in the fixed position. This prevents the adapter 1 from being displaced along ceiling support profile 2.

Because of the out of round shape of the flank sections 1223 of the adjusting mechanism 122, the distances between the flank sections 1223 and the contact surfaces 12121 of the suspension lugs 1212 of the associated mounting sections 121 are increasingly reduced during the adjustment of the adapter 1 to the fixed position. Consequently, the lugs 2214 of the contact sections of the ceiling support profile 2 are clamped between the flank sections 1223 and the suspension lugs 1212 of the adapter 1. The adapter 1 is therefore mounted rigidly and non-displaceably in the fixed position on the ceiling support profile 2 by pressing the mounting sections 121 against the contact sections of the ceiling support profile 2 and by resting the contact surfaces 12121 of the suspension lugs 1212 on the contact surfaces 2216 of the contact sections of the ceiling support profile 2 and by clamping the lugs 2214 of the contact sections of the ceiling support profile 2 between the suspension lugs 1212 and the flank sections 1223 of the adapter 1.

Figure 10:
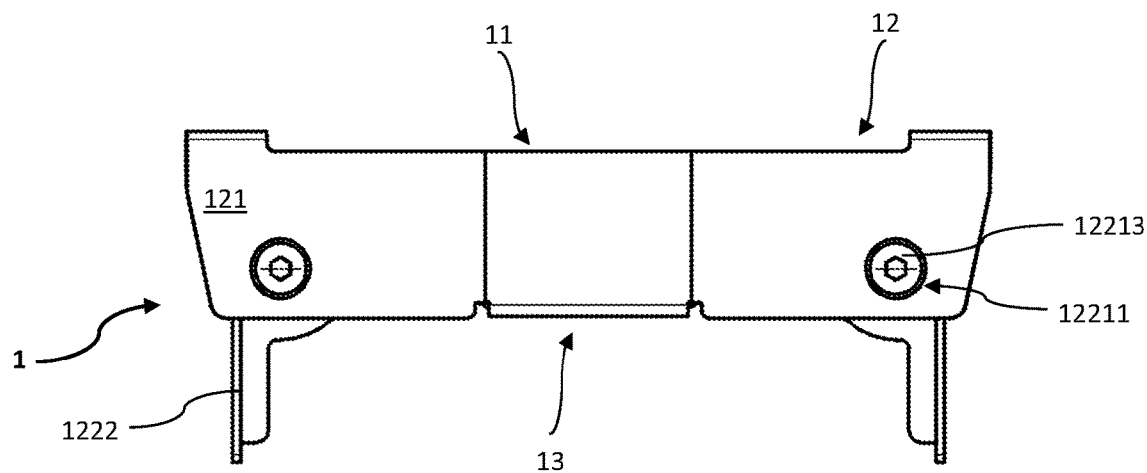
FIG. 10 shows a side view of the adapter of FIG. 1 in a released position.
Figure 11:
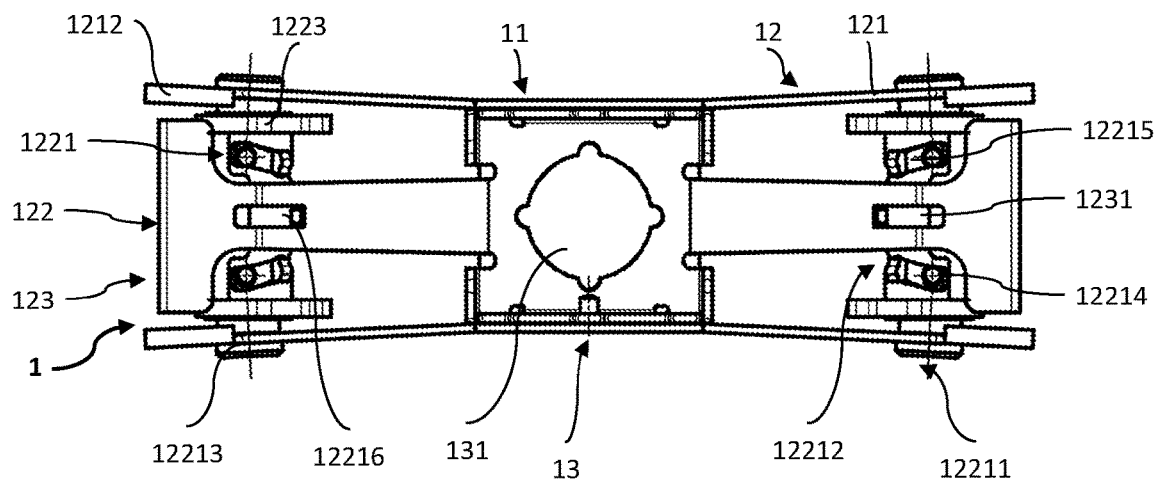
FIG. 11 shows a top view of the adapter of FIG. 10.

FIGS. 10 and 11 show the adapter 1 in a released position. Here, the two actuating levers 1222 are rotated downwards into a vertical position. The pins 12214 of the journals 12211 are located on the outer longitudinal end of the guide contours 12215. The guide contours 1214 run obliquely outwards from their center or saddle. When the actuating levers 1222 are adjusted to the released position, the pins 12214 are pushed outwardly away from each other from the inner edge of the guide contours 12215. Consequently, the journals 12211, and with them the mounting sections 121, are moved away from each other. Here, the mounting sections 121 of a pair are bent resiliently away from each other. In the fixed position the distance between the mounting sections 121 of a pair is therefore greater than in the released position and greater than in the fixed position.

In order to adjust the adapter 1 from the fixed to the suspended position, and also from the suspended to the released position, the spring lever 123 must be pushed upwards. This releases the toothing 12216 from the tooth opening 1231, and the cylindrical sleeves 12212 are released for rotation.

Figure 12:
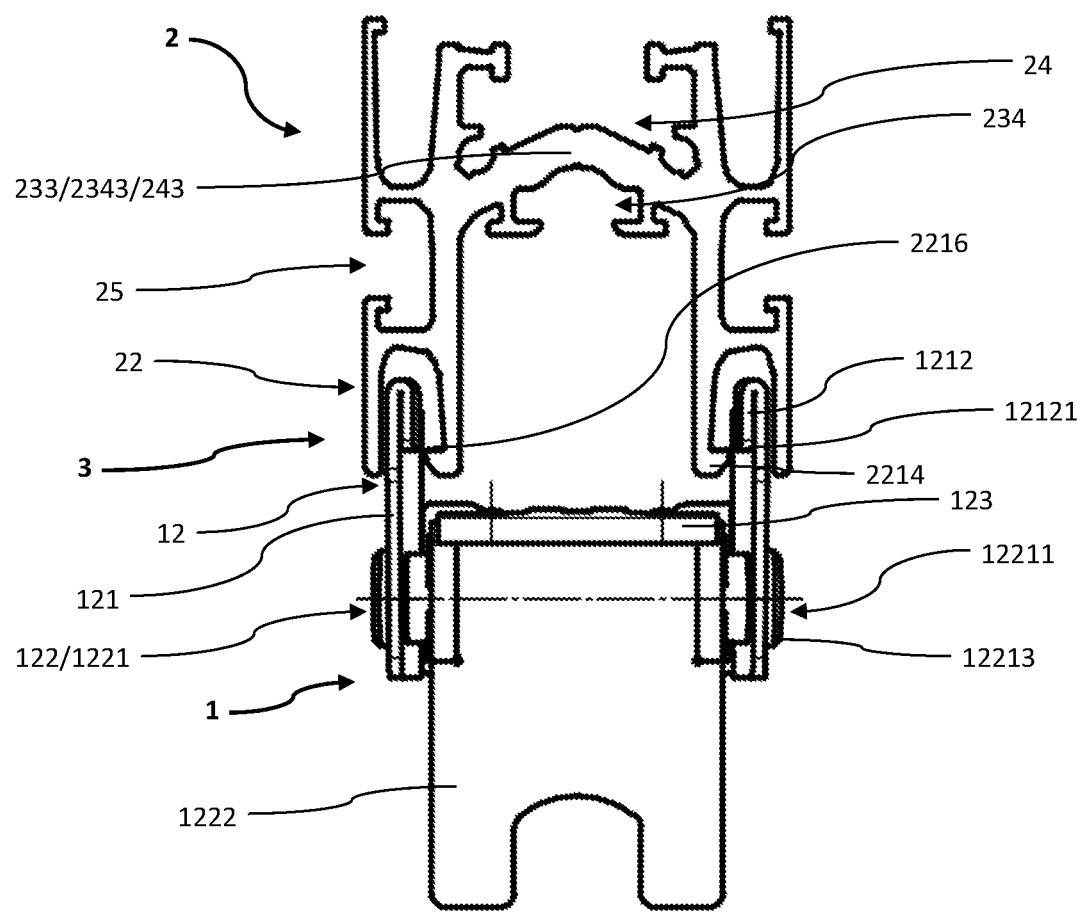
FIG. 12 shows a front view of the adapter and the support profile of the fastening system of FIG. 1 in the released position of the adapter.

FIG. 12 shows the fastening system 3 with the adapter 1 arranged in the released position. Here, the mounting sections 121 are bent outward by the journals 12211 of the axial elements 1221 through the distortion of the cylindrical sleeves 12212 to the extent that the suspension lugs 1212 of the mounting sections 121 no longer engage with the lugs 2214 of the contact sections of the ceiling support profile 2. Moreover, the flank sections 1223 are no longer in contact with the lugs 2214. The mounting sections 121 may be freely extracted vertically downwards from the suspension grooves 22 of the ceiling support profile 2. The adapter 1 can therefore be freely removed from the ceiling support profile 2 and is no longer retained by it.

Although the invention is represented and described in detail by means of the figures and associated description, this representation and this detailed description must be understood to be illustrative and exemplary, and not restricting the scope of the invention. In order not to obscure the invention well-known structures and techniques are not shown and described in detail in some cases. It is understood that experts may make modifications and carry out conversions without departing from the scope of the following claims. In particular, this invention covers further embodiments with any combinations of features which may deviate from the explicitly described feature combinations.

The present disclosure also includes embodiments with any combination of features which are mentioned or shown above and in the following in different embodiments. It also includes individual features in the figures, even if they are shown in connection with other features and/or are not mentioned above or in the following. The alternatives of embodiments described in the figures and in the description, and individual alternatives and their features, may also be excluded from the object of the invention or from the disclosed objects. The disclosure includes embodiments which include exclusively the features described in the claims or in the embodiments, and also those which include other additional features.

In the following the expression "include" and derivations thereof does not exclude other elements or steps. Moreover, the indefinite article "a" and derivations therefrom does not exclude a plural number. The functions of several features listed in the claims may be performed by one unit or one step. The terms "essentially", "about", "approximately" and the like in connection with a feature or a value also define, in particular, that particular feature or that particular value precisely. The terms "about" and "approximately" in connection with a given numerical value or range may refer to a value or range which lies within 20%, within 10%, within 5% or within 2% of the given value or range. All reference symbols in the claims must be understood as not restricting the scope of the claims.

What is claimed is:

1. An adapter for fastening a goods carrier to a longitudinal support profile, comprising:
   a connecting element to which the goods carrier can be connected, and
   a mounting structure by means of which the adapter can be detachably fastened to the support profile, the mounting structure having an adjusting mechanism with which the adapter can be adjusted to a released position, a suspended position and a fixed position,
   wherein in the released position the adapter can be freely arranged on the support profile and removed from it,
   wherein in the suspended position the adapter can be fastened to the support profile and, at the same time, be moved along the support profile,
   wherein in the fixed position the adapter is rigidly connected to the support profile,
   wherein the mounting structure has two opposing mounting sections which interact with two contact sections of the support profile extending along the support profile for fastening the adapter to the support profile, wherein a distance between the mounting sections is variable by the adjusting mechanism of the mounting structure, so that the distance between the mounting sections is different in each case in the released position, the suspended position and the fixed position, and
   wherein the adapter further comprises a base on which the mounting sections of the mounting structure are fastened so that they can be moved resiliently towards and away from each other.

2. The adapter of claim 1, in which the mounting sections of the mounting structure each have a suspension lug with a contact surface, wherein the suspension lugs can be connected to the contact sections of the support profile so that the contact surfaces of the suspension lugs rest against corresponding contact surfaces of the contact sections.

3. The adapter of claim 2, wherein
   in the released position, the distance between the mounting sections is dimensioned so that the contact surfaces of the suspension lugs of the mounting sections can be freely moved past the contact surfaces of the contact sections of the support profile,
   in the suspended position, the distance between the mounting sections is dimensioned so that the contact surfaces of the suspension lugs of the mounting sections rest against the contact surfaces of the contact sections of the support profile when the adapter is arranged on the support profile, and
   in the fixed position, the distance between the mounting sections is dimensioned so that the contact surfaces of the suspension lugs of the mounting sections rest against the contact surfaces of the contact sections of the support profile, and the mounting sections are pressed onto the contact sections of the support profile when the adapter is arranged on the support profile.

4. The adapter of claim 1, wherein the adjusting mechanism of the mounting structure comprises a longitudinally adjustable axial element, which is arranged between the two mounting sections and is connected to them.

5. The adapter of claim 4, wherein the axial element of the adjusting mechanism of the mounting structure comprises a cylindrical sleeve and two journals, wherein the journals are each connected to one of the two mounting sections, project into the cylindrical sleeve and are axially movable relative to the cylindrical sleeve.

6. The adapter of claim 5, wherein the cylindrical sleeve and the journals are rotatable relative to each other about a longitudinal axis.

7. The adapter of claim 6, wherein the journals each have a pin projecting essentially radially, and the cylindrical sleeve is provided with two cutouts provided as guide contours, wherein the pins of the journals each extend through one of the guide contours of the cylindrical sleeve.

8. The adapter of claim 7, wherein the guide contours of the cylindrical sleeve are each shaped so that the journals are axially movable, dependent on a rotation of the cylindrical sleeve and the journals relative to each other.

9. The adapter of claim 6, wherein the adjusting mechanism of the mounting structure has an actuating lever rigidly connected to the cylindrical sleeve, by means of which lever of the cylindrical sleeve is rotatable relative to the journals about the longitudinal axis.

10. The adapter of claim 9, wherein the mounting structure comprises a spring element and the cylindrical sleeve of the axial element is provided with a toothing, wherein the spring element engages in the toothing in the suspended position of the adapter, so that the mounting structure is secured in the suspended position of the adapter.

11. The adapter of claim 6, wherein the adjusting mechanism comprises an out of round flank section arranged at least partially around the cylindrical sleeve of the axial element, so that a distance between the flank section and a contact surface of a suspension lug of one of the mounting sections is smaller in the fixed position of the adapter than in the suspended position of the adapter.

12. A goods carrier with a support profile and an adapter according to claim 1.

13. An adapter for fastening a goods carrier to a longitudinal support profile, comprising:

a connecting element to which the goods carrier can be connected, and a mounting structure by means of which the adapter can be detachably fastened to the support profile, the mounting structure having an adjusting mechanism with which the adapter can be adjusted to a released position, a suspended position and a fixed position, wherein in the released position the adapter can be freely arranged on the support profile and removed from it, wherein in the suspended position the adapter can be fastened to the support profile and, at the same time, be moved along the support profile, wherein in the fixed position the adapter is rigidly connected to the support profile wherein the mounting structure has two opposing mounting sections which interact with two contact sections of the support profile extending along the support profile for fastening the adapter to the support profile, wherein a distance between the mounting sections is variable by the adjusting mechanism of the mounting structure, so that the distance between the mounting sections is different in each case in the released position, the suspended position and the fixed position, and wherein the adjusting mechanism of the mounting structure comprises a longitudinally adjustable axial element, which is arranged between the two mounting sections and is connected to them.

14. The adapter of claim 13, further comprising a base on which the mounting sections of the mounting structure are fastened so that they can be moved resiliently towards and away from each other.

15. The adapter of claim 13, wherein the mounting sections of the mounting structure each have a suspension lug with a contact surface, wherein the suspension lugs can be connected to the contact sections of the support profile so that the contact surfaces of the suspension lugs rest against corresponding contact surfaces of the contact sections.

16. The adapter of claim 15, wherein in the released position, the distance between the mounting sections is dimensioned so that the contact surfaces of the suspension lugs of the mounting sections can be freely moved past the contact surfaces of the contact sections of the support profile, in the suspended position, the distance between the mounting sections is dimensioned so that the contact surfaces of the suspension lugs of the mounting sections rest against the contact surfaces of the contact sections of the support profile when the adapter is arranged on the support profile, and in the fixed position, the distance between the mounting sections is dimensioned so that the contact surfaces of the suspension lugs of the mounting sections rest against the contact surfaces of the contact sections of the support profile, and the mounting sections are pressed onto the contact sections of the support profile when the adapter is arranged on the support profile.

17. The adapter of claim 13, wherein the axial element of the adjusting mechanism of the mounting structure comprises a cylindrical sleeve and two journals, wherein the journals are each connected to one of the two mounting sections, project into the cylindrical sleeve and are axially movable relative to the cylindrical sleeve.

18. The adapter of claim 17, wherein the cylindrical sleeve and the journals are rotatable relative to each other about a longitudinal axis.

19. The adapter of claim 18, wherein the journals each have a pin projecting essentially radially, and the cylindrical sleeve is provided with two cutouts provided as guide contours, wherein the pins of the journals each extend through one of the guide contours of the cylindrical sleeve.

20. The adapter of claim 18, wherein the adjusting mechanism of the mounting structure has an actuating lever rigidly connected to the cylindrical sleeve, by means of which lever the cylindrical sleeve is rotatable relative to the journals about the longitudinal axis.

* * * * *